(12) United States Patent
Hutzelmann et al.

(10) Patent No.: US 11,168,622 B2
(45) Date of Patent: Nov. 9, 2021

(54) SWITCH VALVE AND PISTON ROD WITH SWITCH VALVE

(71) Applicant: Hilite Germany GmbH, Marktheidenfeld (DE)

(72) Inventors: Stefanie Hutzelmann, Graefendorf (DE); Alexander Mudra, Goerlitz (DE); Dietmar Schulze, Muenzenberg (DE)

(73) Assignee: Hilite Germany GmbH, Marktheidenfeld (DE)

( * ) Notice: Subject to any disclaimer, the term of this patent is extended or adjusted under 35 U.S.C. 154(b) by 537 days.

(21) Appl. No.: 14/951,379

(22) Filed: Nov. 24, 2015

(65) Prior Publication Data

US 2016/0312713 A1 Oct. 27, 2016

(30) Foreign Application Priority Data

Apr. 21, 2015 (DE) .......................... 102015106086.8
Jun. 15, 2015 (DE) .......................... 102015109474.6

(51) Int. Cl.
  *F02D 15/02* (2006.01)
  *F16K 11/07* (2006.01)
  *F02B 75/04* (2006.01)
  *F16C 7/06* (2006.01)

(52) U.S. Cl.
  CPC ............ *F02D 15/02* (2013.01); *F02B 75/045* (2013.01); *F16C 7/06* (2013.01); *F16K 11/0704* (2013.01)

(58) Field of Classification Search
  CPC .......... F02D 15/02; F02B 75/045; F16C 7/06; F16K 11/0704
  USPC ........................................... 123/48 AA, 48 B
  See application file for complete search history.

(56) References Cited

U.S. PATENT DOCUMENTS

| 3,405,697 | A | * | 10/1968 | Marchand | ............. | F02B 75/044 |
| | | | | | | 123/47 R |
| 5,165,368 | A | * | 11/1992 | Schechter | ................. | F16C 7/06 |
| | | | | | | 123/48 B |
| 2015/0152794 | A1 | * | 6/2015 | Paul | ........................ | F02D 15/02 |
| | | | | | | 123/48 R |

FOREIGN PATENT DOCUMENTS

| CN | 202545886 U | 11/2012 |
| CN | 103765066 A | 4/2014 |
| DE | 1036062 B | 8/1958 |
| DE | 1208575 B | 1/1966 |
| DE | 4324816 A1 | 1/1995 |
| DE | 102012020999 A1 * | 1/2014 |
| DE | 102012020999 A1 | 1/2014 |

(Continued)

*Primary Examiner* — Lindsay M Low
*Assistant Examiner* — Omar Morales
(74) *Attorney, Agent, or Firm* — Von Rohrscheidt Patents

(57) ABSTRACT

A switch over valve, in particular for controlling a hydraulic fluid flow, comprising: a contact element; and a sleeve shaped connecting section including a first bore hole for connecting with a first hydraulic fluid conduit, a second bore hole for connecting with a second hydraulic fluid conduit, and a relief bore hole for connecting with a relief channel, wherein the contact element is arranged in the sleeve shaped connecting section and optionally displaceable into a first switching position or a second switching position, wherein the first hydraulic fluid conduit is connected with the relief channel in the first switching position and the second hydraulic fluid conduit is connected with the relief channel in the second switching position, characterized in that the cut off valves are provided which are integrated into the switch over valve.

17 Claims, 13 Drawing Sheets

(56) References Cited

FOREIGN PATENT DOCUMENTS

| | | | |
|---|---|---|---|
| DE | 102012112461 A1 * | 6/2014 | .......... F16K 11/0704 |
| DE | 102012112461 A1 | 6/2014 | |
| DE | 102013107293 A1 | 1/2015 | |
| DE | 102013113432 A1 | 6/2015 | |
| WO | WO2011086154 A1 | 7/2011 | |
| WO | WO2014090268 A1 | 6/2014 | |

\* cited by examiner

SWITCH VALVE AND PISTON ROD WITH SWITCH VALVE

RELATED APPLICATIONS

This application claims priority from German patent applications
DE 10 2015 106 086.8 filed on Apr. 21, 2015, and
DE 10 2015 109 474.6 filed on Jun. 15, 2015,
both of which are incorporated in their entirely by this reference.

FIELD OF THE INVENTION

The invention relates to a switch over valve, in particular for controlling a hydraulic fluid flow, in particular for switching an eccentrical element adjustment device in a piston rod for a variable compression of an internal combustion engine of a motor vehicle and a piston rod including the switch over valve.

BACKGROUND OF THE INVENTION

In internal combustion engines a high compression ratio has a positive impact on efficiency. Typically a compression ratio relates to a ratio of an entire cylinder volume before compression compared to a remaining cylinder volume after compression. Internal combustion engines with external ignition, in particular gasoline engines which have a fixed compression ratio only allow a compression ratio at a level that still prevents so called knocking of the internal combustion engine under full load operation. However, a higher compression ratio could be selected for partial load operation of the internal combustion engine, thus at a lower filling charge of the cylinder without any knocking occurring. The important partial load operation of the internal combustion engine can be improved when the compression ratio is variably adjustable. In order to adjust the compression ratio systems are known for example that have a variable piston rod length and which actuate an eccentrical element adjustment device of the piston rod through hydraulic switch over valves.

A switch over valve of this general type is known from DE 10 2012 112 461 A1. The switch over valve includes a contact element whose surface includes a groove. Furthermore the switch over valve includes a sleeve shaped connecting section. The sleeve shaped connecting section includes a first bore hole which connects the switch over valve with a first hydraulic fluid conduit. The sleeve shaped connecting section furthermore includes a second bore hole which connects the switch over valve with a second hydraulic fluid line. Furthermore the sleeve shaped connecting section includes a ventilation bore hole which connects the switch valve with a ventilation channel. The contact element is arranged in the sleeve shaped connecting section and optionally displaceable into a first switching position wherein the groove configured in the contact element connects the first hydraulic fluid conduit with the ventilation channel in the first switching position and wherein the groove configured in the contact element connects the hydraulic fluid with the ventilation channel in the second switching position. The sealing in the sleeve shaped connecting section is performed in a radial direction using the contact element. In order to prevent a binding of the contact element, however, clearance has to be provided between the contact element and the connecting section, wherein the clearance causes leakage. In a piston rod configured for a variable compression of an internal combustion engine with an eccentrical adjustment device for adjusting an effective piston rod length this leakage can cause an undesirable length change of the piston rod and thus an undesirable change of compression.

BRIEF SUMMARY OF THE INVENTION

It is an object of the invention to provide a switch over valve for controlling a hydraulic fluid flow wherein the switch over valve has little leakage.

It is another object of the invention to provide a piston rod with the switch over valve wherein the switch over valve has little leakage.

The recited objects are achieved by a switch over valve, in particular for controlling a hydraulic fluid flow, comprising: a contact element; and a sleeve shaped connecting section including a first bore hole for connecting with a first hydraulic fluid conduit, a second bore hole for connecting with a second hydraulic fluid conduit, and a relief bore hole for connecting with a relief channel, wherein the contact element is arranged in the sleeve shaped connecting section and optionally displaceable into a first switching position or a second switching portion, wherein the first hydraulic fluid conduit is connected with the relief channel in the first switching position and the second hydraulic fluid conduit is connected with the relief channel in the second switching position, characterized in that the cut off valves are provided which are integrated into the switch over valve, wherein the cut off valves release or block a flow of the hydraulic fluid from the first bore hole or the second bore hole in a direction towards the relief channel as a function of a position of the contact element.

The object of the invention is also achieved by a piston rod for a variable compression ratio of an internal combustion engine, comprising an eccentrical element adjustment device for adjusting an effective connecting rod length, wherein the eccentrical element adjustment device includes an eccentrical element interacting with an eccentrical lever; two pistons that are respectively displaceably supported in a hydraulic cavity and wherein eccentrical element rods of the eccentrical element adjustment device engaging the eccentrical element are supported at the two pistons, wherein an adjustment travel of the eccentrical element adjustment device is adjustable by the switch over valve recited supra.

Advantageous embodiments of the invention can be derived from the subsequent claims, the description and the drawing figure.

A switch over valve is proposed, in particular for controlling a hydraulic fluid flow with a contact element and a sleeve shaped connecting section with a first bore hole for connecting with a first hydraulic fluid conduit, with a second bore hole for connecting with a second hydraulic fluid conduit and a relief bore hole for connecting with a relief channel. Thus, the contact element is arranged in the sleeve shaped connecting section and optionally moveable into a first switching position or into a second switching position. In the first switching position the hydraulic fluid conduit is connected with the relief channel and in the second switching condition the second hydraulic fluid conduit is connected with the relief channel.

According to the invention two cut off valves are provided which are integrated into the switch over valve and which release or block a flow of the hydraulic fluid from the first bore hole or the second bore hole in the direction of the relief channel as a function of the contact element.

Advantageously the switch over valve according to the invention has less hydraulic fluid leakage than the known switch over valves. Mechanically actuated switch over valve typically support a contact element configured as a piston or slide in a sleeve shaped connecting section of a housing that is configured as a bore hole. Since clearance has to be provided between the piston and the housing to prevent a binding of the piston this concept typically causes leakage. Such hydraulic fluid leakage can lead to an undesirable position change of a control piston which causes an adjustment of an eccentrical device in a piston rod for adjusting an effective piston rod length. This can cause an undesirable position change of the piston rod and thus an undesirable change of the compression of the internal piston engine.

Such unwanted changes can be reduced or even avoided with the switch over valve according to the invention. The switch over valve according to the invention provides an improved sealing of hydraulic cavities of control pistons over the prior art and thus provides substantially improved positional stability of an adjustable piston rod. Thus, the switch over valve includes two cut off valves which are mechanically actuated by profile surfaces which are arranged as an inner profile in the contact element so that they establish a connection between the first hydraulic fluid conduit and the relief channel as an alternative in the first switching position and establish a connection between the second hydraulic fluid conduit and the relief channel in the second switching position. Opening and closing the cut off valves is thus performed by the profile surfaces of the contact element arranged in a form of a coulisse. The cut off valves are thus integrated into the switch over valve. This way an open hydraulic cavity of a control piston of the piston rod can be relieved into a tank drain in a direction towards the crank case. The cut off valves prevent an undesirable leakage of the hydraulic fluid. Thus, stable operations of a piston rod adjustment device is facilitated in a simple manner for a variable compression of an internal combustion engine.

The switch over valve according to the invention with integrated cut off valves facilitate improved sealing and thus improved position stability of the piston rod compared to what is known in the art. An unintentional change of the compression ratio can thus be avoided.

Through integration of the two cut off valves it is furthermore possible to omit check valves in the hydraulic fluid conduits through which the hydraulic cavities are loadable with the hydraulic fluid.

According to an advantageous embodiment the cut off valves can be arranged in the portion of the first bore hole and in the portion of the second bore hole in the sleeve shaped connecting section. Thus, the cut off valves advantageously control a hydraulic connection between the first bore hole which is connected with the first hydraulic fluid conduit and the relief channel and a hydraulic connection between the second bore hole which is connected with the second hydraulic fluid conduit and the relief channel. Alternatively the connection between the first bore hole and the relief channel can be open or closed, whereas the connection between the second bore hole and the relief channel can be closed or open in a manner that is complementary thereto. The complementary control of the switching positions is implemented by the profile surfaces of the contact element since a mechanical control is implemented, this is also achieved with great reliability.

According to an advantageous embodiment the contact element can have an inner profile with two contact surfaces for actuating the cut off valves. Decoupling the control of the two cut off valves through separate actuation by two profile surfaces implements safe actuation of the cut off valves and mutual locking in an advantageous manner. The inner profile with the two profile surfaces thus also facilitates an implementation of a desired transition of the opening and closing process between the two cut off valves through a suitable profile.

According to an advantageous embodiment the first cut off valve can be opened in the first switching position by actuating the cut off valve through the first profile surface and the second cut off valve can be closed, whereas in the second switching position the second cut off valve can be opened by actuating the cut off valve through the second profile surface and the first cut off valve can be closed. Advantageously the actuation cycles can be arranged so that an alternative opening and closing of the two cut off valves is assured in any case. The positions can be implemented through a suitable shape of the inner profile with a high level of reliability and they are also easily variable in production by selecting a respective contact element with a suitable shape.

According to an advantageous embodiment the contact element can be configured lockable in a first switching position in the first interlocking groove and in a second switching position in the second interlocking groove using an interlocking element. This way the switching function of the switch over valve is assured by the mechanical configuration of the interlocking. Thus, also the conditions of the interlocking valves are lockable since the actuation of the interlocking valves is performed through the contact element and mechanically coupled with its position in the switch over valve. Thus, a cut off valve cannot be actuated unintentionally and cannot enter an unintended condition. Thus, a high level of switching reliability of the switch over valve and thus also of the cut off valves is achieved.

According to an advantageous embodiment the cut off valves can respectively include a plunger that is moveably arranged in a housing and configured as a valve closure element wherein the plunger can be applied in a sealing manner to a valve seat configured at the housing. Thus, the plunger is used as a sealing element and also as a control element for a flow through of the hydraulic fluid through the cut off valve and also as an actuation element for the valve function. Pressure on the plunger can open the cut off valve. When no pressure is imparted on the plunger the plunger is pressed by the spring element with its sealing surface onto the valve seat arranged at the housing, thus seals the open passage with the cut off valve. Thus, the cut off valve is closed. Through the characteristic curve of the spring and the internal control of the plunger through the profile surfaces the properties of the opening and closing process can be influenced.

According to an advantageous embodiment the cut off valves can be openable and closable through actuating the plunger through an axial movement of the contact element with the profile surfaces. Through the axial movement of the contact element the profile surfaces are being moved over the end of the plunger and thus according to shapes of the profile surfaces impart a higher or lower pressure onto the plunger. Through the pressure of the profile surfaces on the plunger a force of the spring element is overcome and the plunger can move against the opposite force of the spring element. According to the shape of the profile surfaces the plunger is displaced along its axis which is advantageously oriented radially relative to a movement of the contact element. Thus, a small change in the height of the profile surface can cause a desired displacement of the plunger and thus an opening of the cut off valve.

According to an advantageous embodiment the plunger can be applied to the valve seat in a sealing manner by means of the spring element using an axial pull force. Thus, the spring element is arranged so that it pulls the plunger through the spring force into the valve seat. This provides reliable sealing of the hydraulic flow through the cut off valve. This arrangement of the spring element provides a safer function of the cut off valve with an even lower leakage of the cut off valve.

According to an advantageous embodiment the plunger can be provided essentially cylindrical. A cylindrical shape of the plunger is advantageous for producing the plunger and also for a safe function of the cut off valve. Thus, a support of the plunger can be provided in a simple manner in bore holes which is typical for valves. Also the force distribution in the plunger through loading by the spring element and the pressure over the profile surfaces can be configured in an advantageous manner.

According to an advantageous embodiment the valve seat can be configured cone shaped. Through a cone shaped valve seat a safe sealing function can be combined with advantageous fabrication. Through the cone shape of the valve seat the opposite contour of the plunger is pulled into the valve seat and production tolerances are less relevant than for a flat contour of the valve seat. Thus, the seal contour can be arranged in a space saving manner in the overall configuration of the cut off valve so that a compact configuration is advantageously provided.

According to an advantageous embodiment the plunger and/or the housing can include at least one hydraulic fluid flow through groove. In order to facilitate a flow through of a sufficient amount of hydraulic fluid the plunger and/or the housing of the cut off valve include at least one hydraulic fluid flow through groove so that the hydraulic fluid can flow along the plunger through the cut off valve. A groove of this type is easy to manufacture in that the shaft of the plunger has a suitable flat contour which is producible in an advantageous manner by milling the shaft.

According to an advantageous embodiment the contact element can be configured so that an axial movement of the contact element leads to a radial movement of the plunger. Through an axial movement of the contact element and an ensuing axial movement of the profile surface through the plunger that is arranged perpendicular thereto in the radial direction a force transmission from the profile surface onto the plunger can be advantageous. Thus, a longer axial movement can cause a radial movement of the plunger with a greater force. Thus, the cut off valve can be actuated in an advantageous manner. The spring element for closing the cut off valve can be selected with a suitable strength for a safe closing and sealing. In spite of that the axial movement of the contact element facilitates a safe actuation of the plunger to cause an opening of the cut off valve.

According to an advantageous embodiment the spring element can be arranged preloaded between a housing shoulder and a spring plate, wherein the spring plate is provided as a lock plate that is snap locked into a shoulder of the plunger. The spring element is advantageously preloaded so that it pulls the plunger into the valve seat so that it is assured that the cut off valve is safely closed when the plunger is not actuated. For mounting the cut off valve it is advantageous to push the spring element over the housing and the plunger, to preload the spring element and snap lock a lock plate into the plunger which provides support for the spring element at the plunger.

According to an advantageous embodiment the cut off valves can be respectively provided pressed with a housing into the sleeve shaped connecting section against a shoulder of the bore hole. This way a safe mounting of the cut off valve can be provided in the sleeve shaped connecting section. The shoulder of the bore hole provides a fixed contact point so that the cut off valve can be mounted in a reproducible manner and a geometric position is provided which leads to a safe function when actuating the plunger through the axial movement of the contact element.

According to another advantageous embodiment the cut off valves can respectively include a leaf spring element configured as a valve closing element which in a first condition of the cut off valve can contact the sleeve shaped connecting section above the bore holes in a sealing manner and wherein the leaf spring element is respectively actuatable by a radially moveable ball element. A cut off valve of this type represents an alternative embodiment of a cut off valve. Thus a leaf spring element is used as a sealing element and also as a reset spring which keeps the cut off valve closed in a non-actuated condition. The leaf spring element contacts the sleeve shaped connecting section in non-actuated condition and thus seals the bore hole. Thus, a ball element that is radially moved over the profile surface can cause a lift off of the leaf spring element from the sealing surface and can thus open the cut off valve. This embodiment of a cut off valve represents an option to implement a closing function in a switch over valve which can be fabricated in a very economical manner.

According to an advantageous embodiment the leaf spring element can be openable and closable by the ball element through an axial movement of the contact element with the profile surface. The ball element can be rolled over the profile surface for an axial movement of the contact element and can thus travel along the contour. Thus, the ball element receives a radial force through the shape of the profile surface and thus a radial displacement which is transmitted to the leaf spring element and can thus lead to a lift off of the leaf spring element from the sleeve shaped connecting section and thus from the sealing seat. This way the cut off valve can be opened in a suitable manner.

According to an advantageous embodiment the cut off valves can be respectively provided as a preassembled modules. Thus the cut off valves can be provided as a sub assembly which can be mounted and tested separately. Optionally the pre load of the spring element can be adjusted and calibrated in a suitable manner before being installed into the switch over valve. This facilitates an economical fabrication of the switch over valve. Also for the embodiment of the leaf spring element as a closing element a pre assembly of the leaf spring element can be provided with a spring support so that mounting at the sleeve shaped connecting section can be achieved in a simple and quick manner after inserting the ball element into a ball seat.

According to another aspect the invention relates to a piston rod for a variable compression of an internal combustion engine with an eccentrical element adjustment device for adjusting an effective piston rod length, wherein the eccentrical element adjustment device includes an eccentrical element that interacts with an eccentrical lever wherein the eccentrical element adjustment device includes two pistons which are respectively supported movable in a linear manner in a hydraulic cavity and in which eccentrical element rods of the eccentrical adjustment device are supported at the eccentrical lever, wherein an adjustment travel of the eccentrical element adjustment device is adjustable by a switch over valve. Changing the adjustment travel changes the effective connecting rod length. This can be used to control the compression ratio of an internal combustion engine. A piston rod of this type can include an eccentrical element adjustment device which is provided in particular for switching the actuation pistons in the piston rod for a variable compression ratio of the internal combustion engine.

BRIEF DESCRIPTION OF THE DRAWINGS

Additional advantages can be derived from the subsequent description of the drawings. The drawing illustrate embodiments of the invention. The drawings, the description and the claims include plural features in combination. A person skilled in the art will consider the features individually and combine them into additional useful embodiments, wherein:

DETAILED DESCRIPTION OF THE INVENTION

Figure 1:
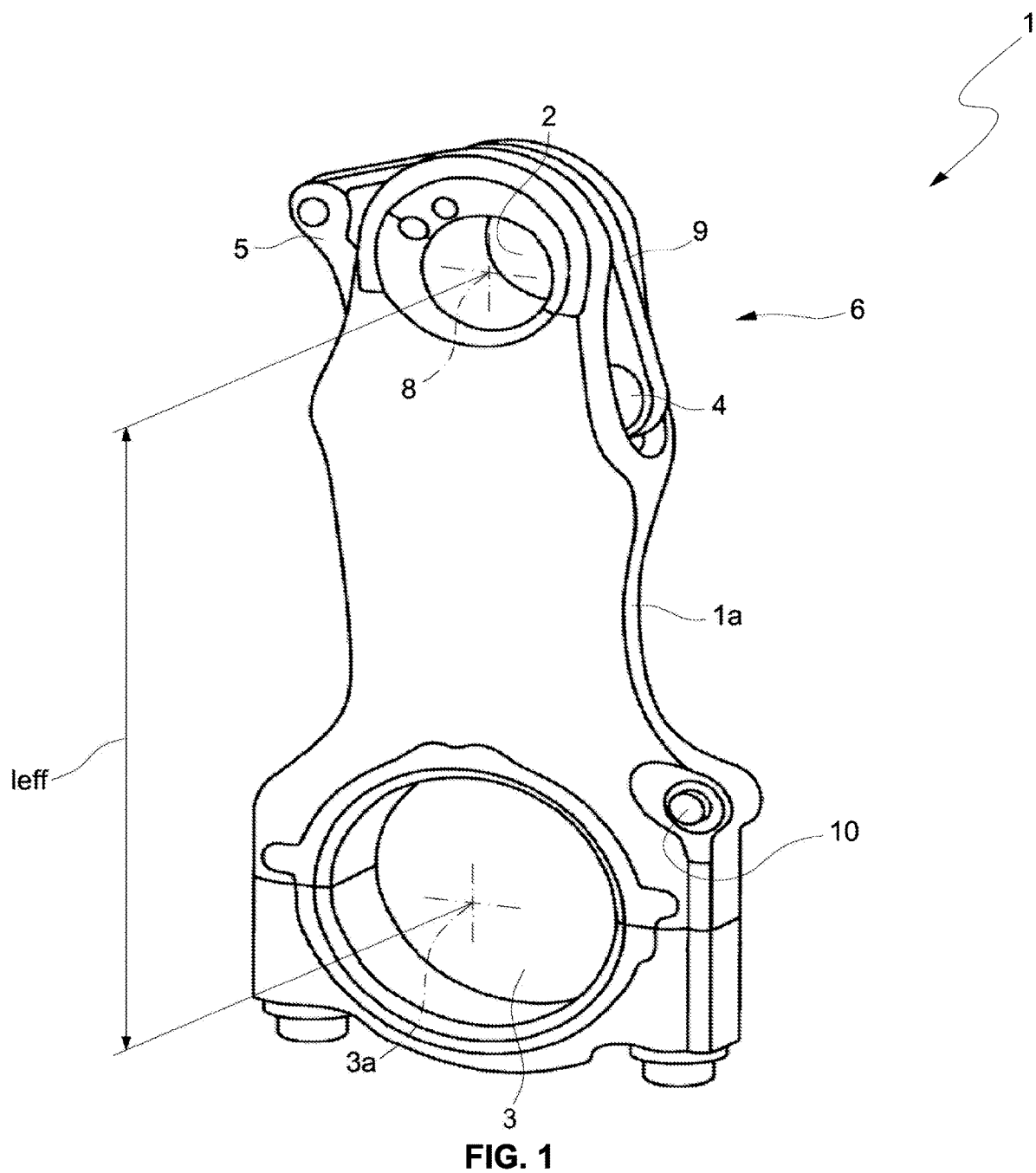
FIG. 1 illustrates a schematic representation of a known piston rod.

In the figures identical or equivalent components are designated with identical reference numerals. The figures only illustrate exemplary embodiments and do not limit the scope of the invention.

FIG. 1 illustrates another schematic representation of a known piston rod 1 which includes a connecting rod 1a and an adjustable eccentrical adjustment device 6 which is arranged at least in sections in a piston rod bearing eye 2. The eccentrical element adjustment device 6 includes a wrist pin bore hole with a center axis 3a which receives a wrist pin wherein the wrist pin bore hole is arranged eccentrical relative to a center axis 8 of the piston rod bearing eye 2. The eccentrical element adjustment device 6 is used for adjusting an effective connecting rod length leff. The connecting rod length leff is defined as a distance of the center axis 8 of the crank journal eye 3 from the center axis 3a of the wrist pin bore hole.

A rotation of the adjustable eccentrical element adjustment device 6 is initiated by an impact of mass and load forces of the internal combustion engine which impact the eccentrical element adjustment device 6 during an operating cycle of the internal combustion engine. During an operating cycle the effective direction of the forces impacting the eccentrical element adjustment device 6 change continuously. The rotating movement or adjustment movement is supported by pistons that are loaded with hydraulic fluid, in particular with motor oil, which are integrated in the piston rod 1 and not illustrated or the pistons prevent a resetting of the eccentrical element adjustment device 6 due to variable forced effective directions of the forces impacting the eccentrical element adjustment device 6.

The pistons are connected by eccentrical element rods 4, 5 with an eccentrical element 9 of the eccentrical element adjustment device 6. The pistons are moveably arranged in hydraulic cavities and loaded from the crank journal eye 3 with hydraulic fluid through non illustrated check valves and through non illustrated fluid conduits. The check valves thus prevent a flow back of the hydraulic fluid from the hydraulic cavities back into the hydraulic fluid conduits into a bearing shell of the crank journal eye and thus facilitate a suction of hydraulic fluid into the hydraulic chambers. The hydraulic chambers are connected with a first hydraulic fluid conduit 18 and with a second hydraulic fluid conduit 20 which interface with a switch over valve 10.

Figure 2:
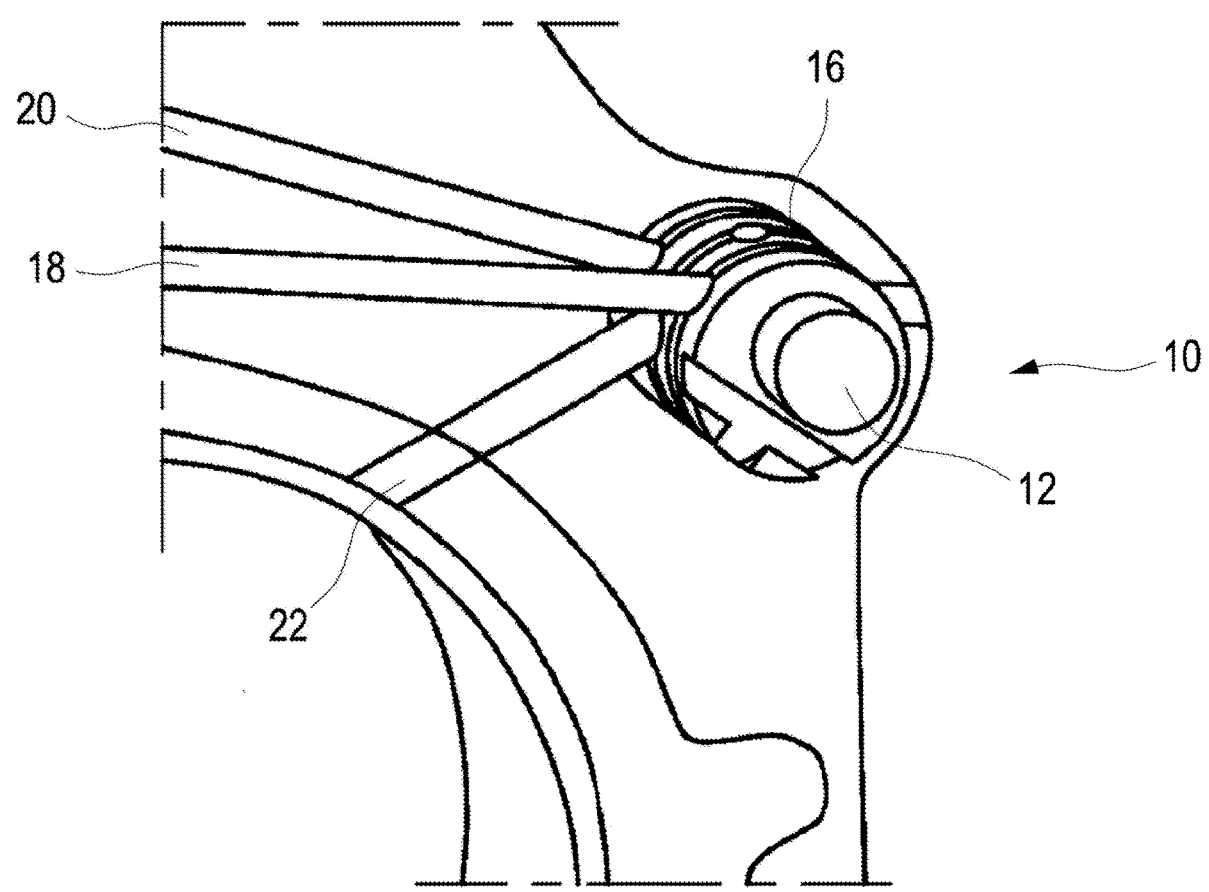
FIG. 2 illustrates a schematic arrangement of a known switch over valve in the piston rod according to FIG. 1.
Figure 3:
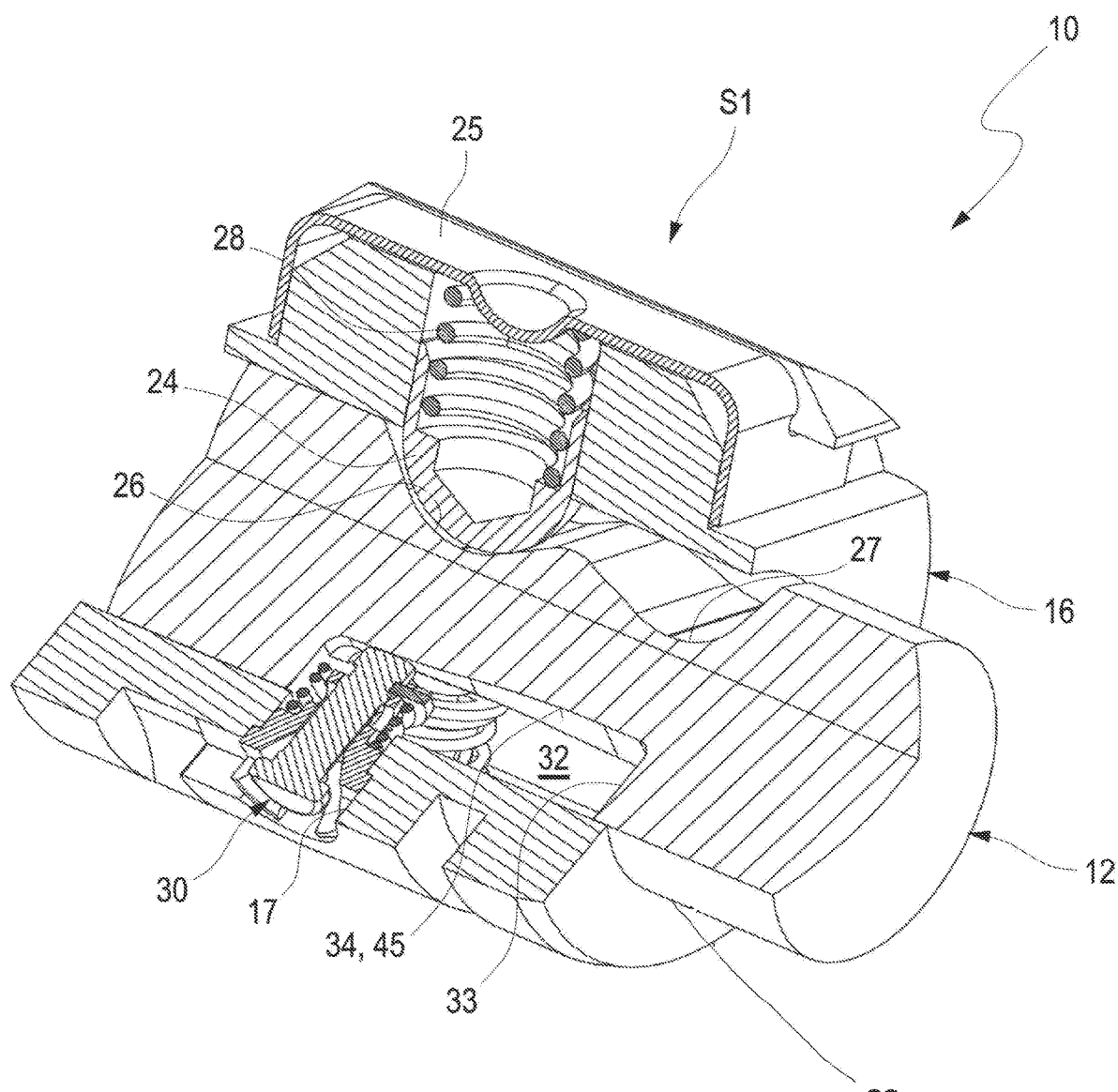
FIG. 3 illustrates a schematic three dimensional representation of a switch over valve according to an embodiment of the invention in a longitudinal sectional view.

FIG. 2 illustrates a schematic arrangement of a known switch over valve in the piston rod 1. The switch over valve 10 includes a contact element 12 and a sleeve shaped connecting section 16, wherein the contact element 12 is arranged in the sleeve shaped connecting section 16 and optionally movable into a first switching position S1 or a second switching position S2. In the first switching position S1 the first hydraulic fluid conduit 18 is connected with a relief channel 22 through the switch over valve 10. On the other hand side there is a connection of the second hydraulic fluid conduit 20 with the relief channel 22 in the second switching position S2. Through the relief channel 22 the hydraulic fluid can flow into a bearing shell from which the hydraulic fluid can be provided to the hydraulic chambers again.

A switch over valve 10 according to the invention can be derived for example from the subsequently described FIGS. 3-6 in a first embodiment wherein the figures illustrate the switch over valve 10 respectively in the switching S1 in three longitudinal sectional views and in a cross sectional view. As a matter of principle the switch over valve 10 according to the invention has the same functionality and a very similar configuration as the known switch over valve.

As illustrated the switch over valve 10 includes the sleeve shaped connecting section 16 and the contact element 12 which is at least partially inserted into the sleeve shaped connecting section 16 in the contact element bore 23. The sleeve shaped connecting section 16 includes a first bore hole 17 which is connected with the first hydraulic fluid conduit 18. A second bore hole 19 of the sleeve shaped connecting section 16 is connected with the second hydraulic fluid conduit 20. Furthermore a relief bore hole 21 that is illustrated in FIG. 6 is connected in the sleeve shaped connecting section 16 with the relief channel 22.

The contact element 12 is fixated by an interlocking element 24 and a spring 25 in the first switching position S1 wherein the interlocking element 24 and the spring 25 interact with interlocking grooves 26, 27 configured in the contact element 12. Evidently the interlocking element 24 is preloaded by a spring element 28 in a direction towards the contact element 12. Overall two interlocking grooves 26, 27 are provided so that a respective interlocking groove 26, 27 is provided for receiving the interlocking element 24 for the first switching position S1 and for the second switching position S2 of the switch over valve 10.

Figure 6:
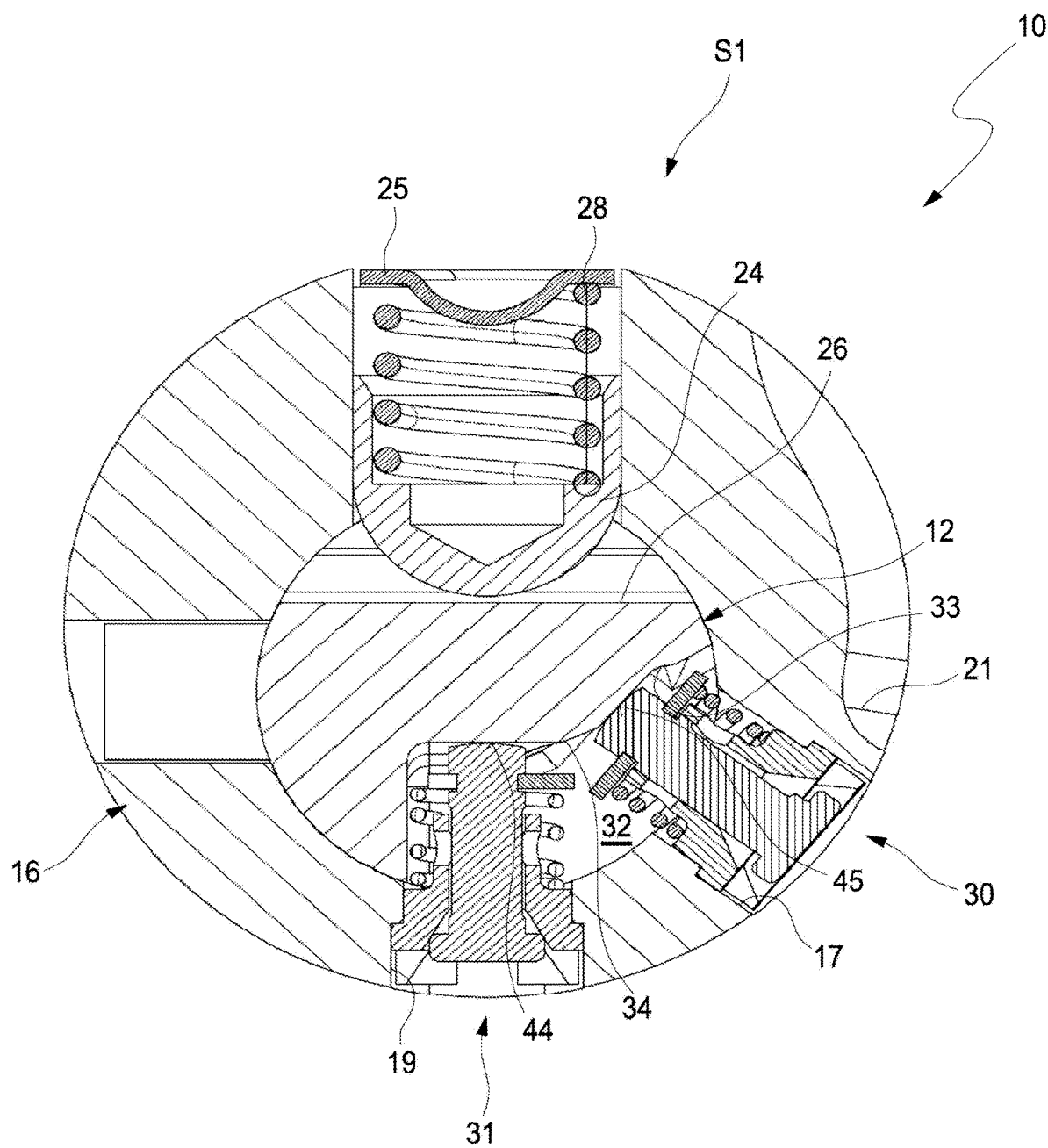
FIG. 6 illustrates a schematic representation of the switch over valve according to an embodiment of the invention in a cross sectional view.

As can be derived in particular from FIG. 6 the two cut off valves 30, 31 are provided integrated into the switch over valve 10 in the portion of the two bore holes 17, 19, wherein the two cut off valves release or block a flow of hydraulic fluid from the first bore hole 17 or the second bore hole 19 through the relief bore hole 21 in a direction towards the relief channel 22 as a function of a position of the contact element 12.

The two bore holes 17 and 19 and the relief bore hole 21 are connected with a hydraulic cavity 32 which is configured as a recess 33 and defined by an inner wall of the sleeve shaped connecting section 16. In the first switching position S1 the first cut off valve 30 is open and releases a flow through of the hydraulic fluid from the first hydraulic fluid conduit 18 through the bore hole 17 and the hydraulic cavity 32 in a direction of the relief channel 22 so that the hydraulic cavity connected with the first hydraulic fluid conduit 18 can drain. The second cut off valve 31 is blocked in this switching position S1 and a connection of the second hydraulic fluid conduit 20 with the relief channel 22 is not possible. In the second switching position S2, however, the first cut off valve 30 is closed and the second cut off valve 31 is opened so that the hydraulic cavity that is connected with the second hydraulic fluid conduit 20 can empty. Thus, a reliable sealing of the respectively closed hydraulic connection is facilitated. In the FIGS. 3-6 the switch valve 10 is respectively illustrated in the first switching position S1.

An alternative embodiment which is not illustrated provides that a relief channel drains the hydraulic fluid directly from the hydraulic cavity 32 from the connecting rod 1a in a direction towards the tank. It is also feasible that one hydraulic cavity is drained in a direction towards a bearing shell and the other hydraulic cavity is drained in a direction towards the tank.

Actuating the cut off valves 30, 31 is provided by an inner profile 34 of the recess 33. This inner profile 34 is configured with two profile surfaces 44, 45 so that an axial movement of the contact element 12 leads to an actuation of the cut off valves 30, 31, wherein the axial movement of the contact element 12 thus leads to a radial movement of the plungers 36.

Figure 7:
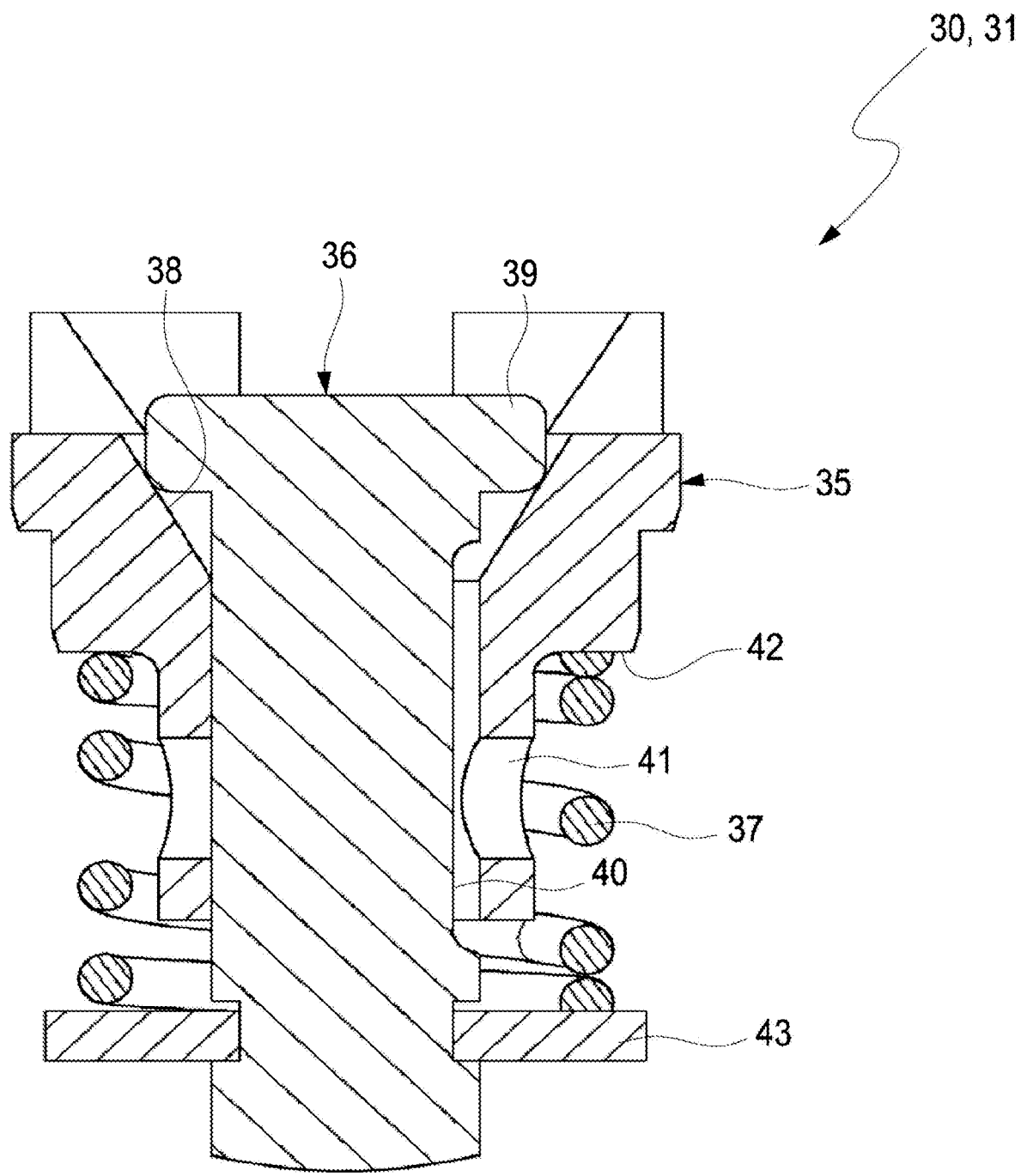
FIG. 7 illustrates a schematic representation of a closed cut off valve of the switch over valve according to FIGS. 3-6 in a longitudinal sectional view.
Figure 8:
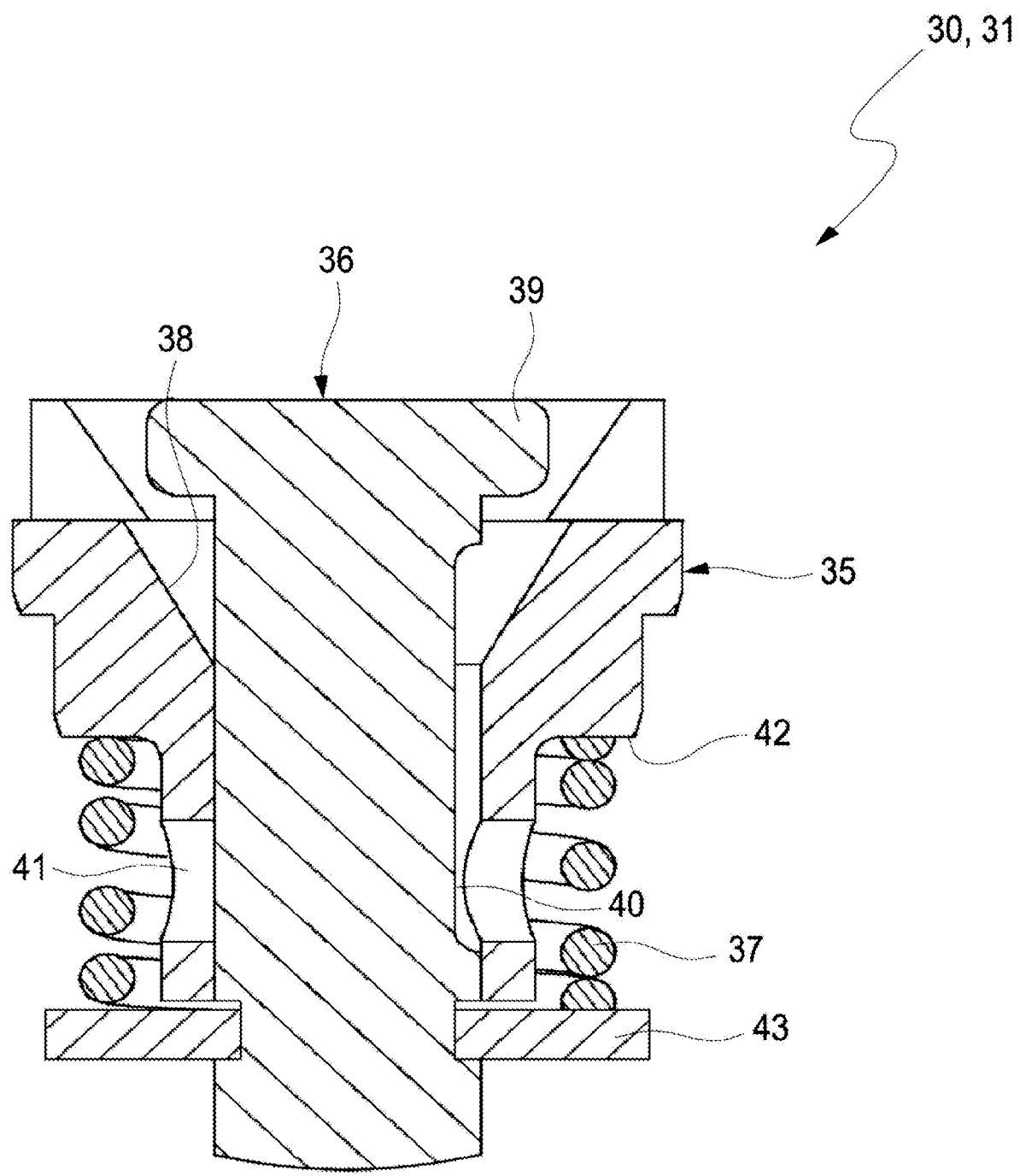
FIG. 8 illustrates a schematic representation of an open cut off valve of the switch over valve according to FIGS. 3-6 in a longitudinal sectional view.

The cut off valves 30, 31 which are illustrated enlarged in FIGS. 7 and 8 in a closed condition and in an open condition are advantageously respectively provided as a sub assembly that can be preassembled independently and they are pressed into the bore holes 17, 19 with a housing 35 against a shoulder.

The cut off valves 30, 31 respectively include a substantial cylindrical plunger 36 configured as valve closing element and respectively moveably arranged in the housing 35, wherein a head 39 of the plunger is applicable in a sealing manner at a valve seat 38 configured at the housing 35 wherein the application is provided by a spring element 37.

The plunger 36 is thus applied to the valve seat 38 by the spring element 37 by an axial pull force.

The spring element 37 is thus arranged at a drain side of the cut off valve 30, 31. Put differently the spring element is provided below the valve seat 38 or in the switch over valve 10 radially further inside than the valve seat 38. The valve seat 38 is configured at the housing 35 with a conical shape. Alternatively the plunger 36 can also be configured with a conical shape in the portion of the head 39.

Figure 4:
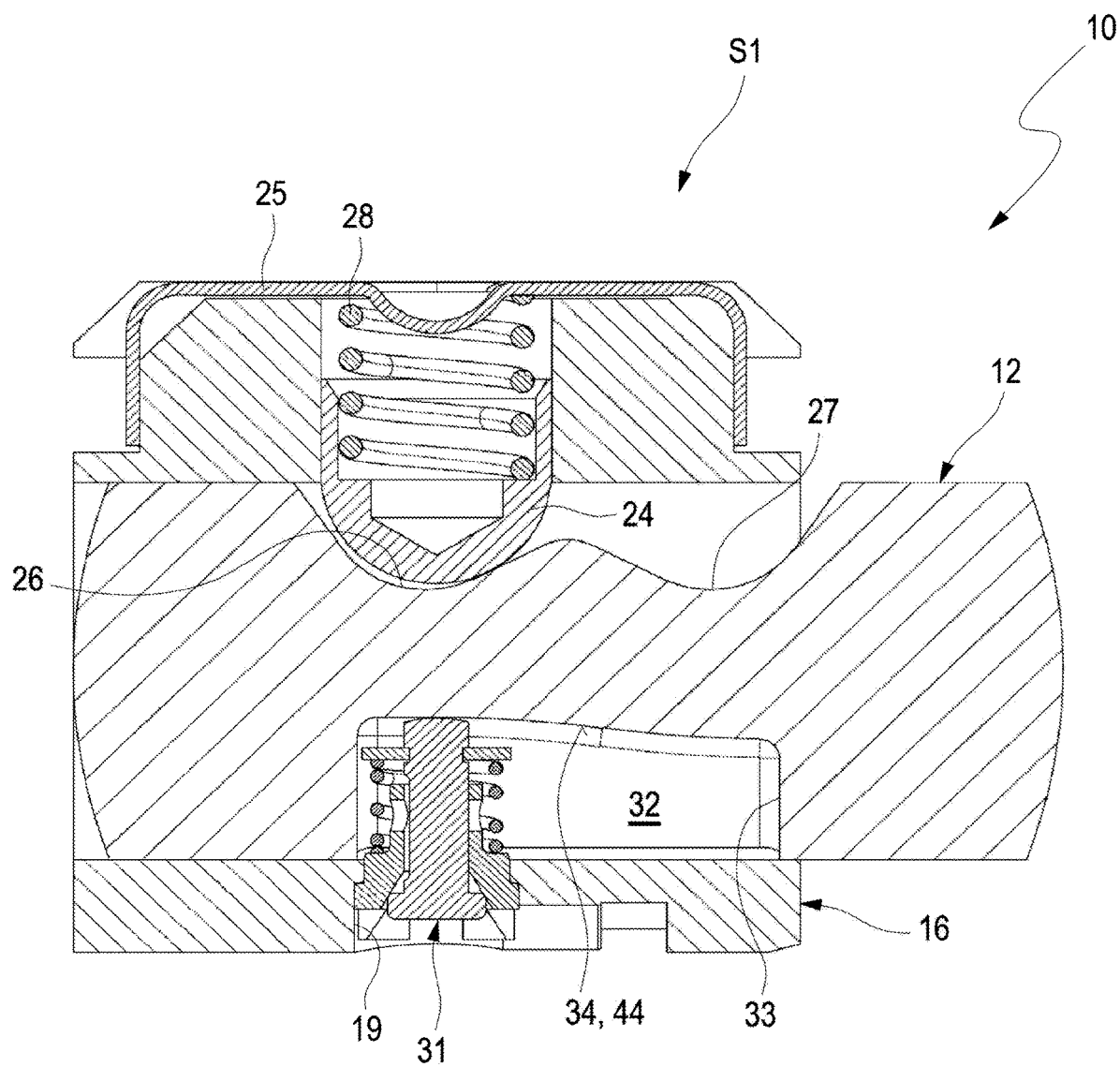
FIG. 4 illustrates a schematic representation of the switch over valve according to an embodiment of the invention in a second longitudinal sectional view.
Figure 5:
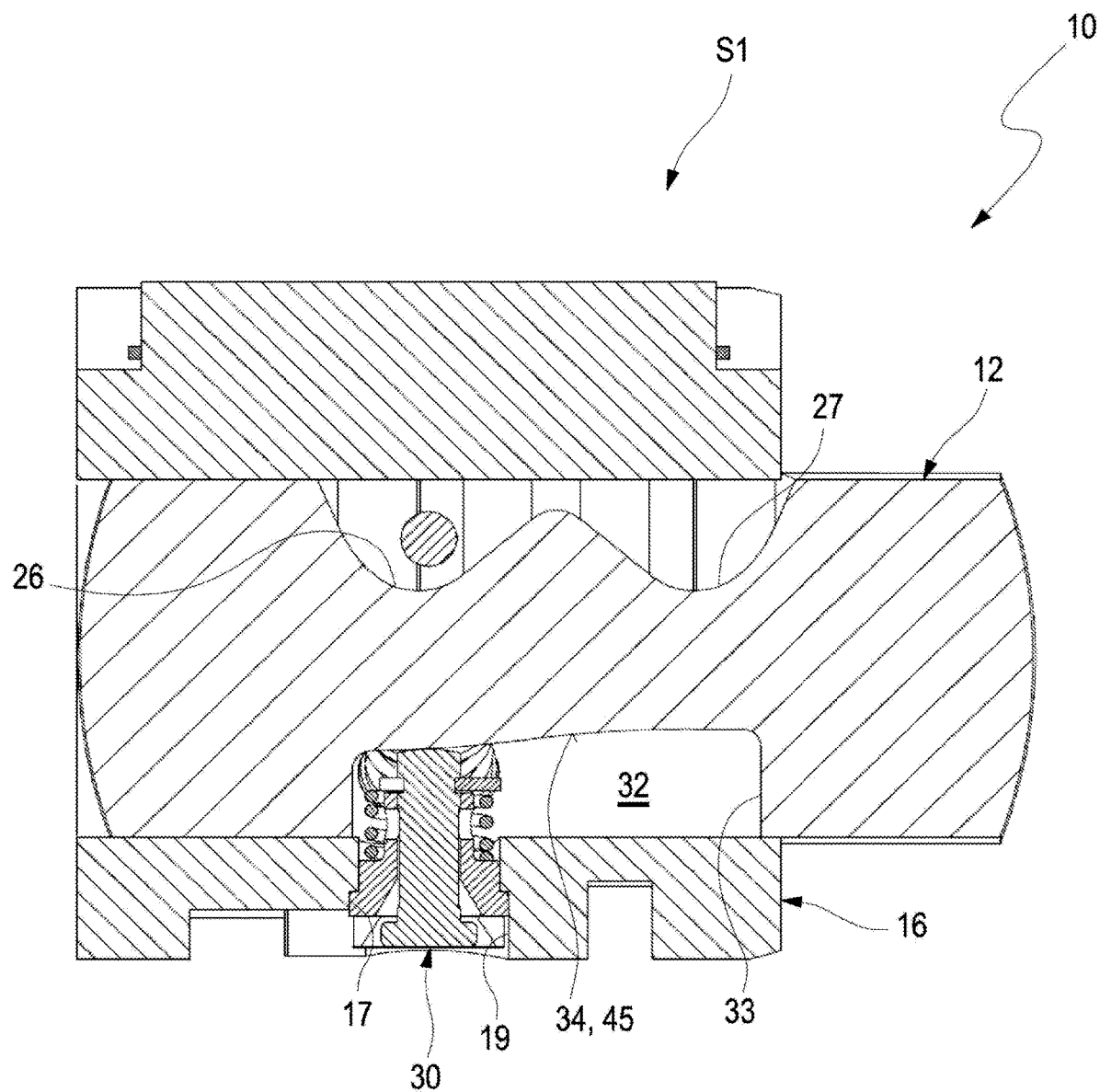
FIG. 5 illustrates a schematic representation of the switch over valve according to an embodiment of the invention in a third longitudinal sectional view.

As apparent in particular from FIGS. 4 and 5 the plungers 36 respectively contact a profile surface 44, 45 of the inner profile 34 of the recess 33. Thus, the cut off valves 30, 31 are openable and closable by actuating the plunger 36 through an axial movement of the contact element 12 with the profile surfaces 44, 45. It is evident that the profile surfaces 44, 45 have an opposite slope, wherein the described alternative actuation of the cut off valves 30, 31 in both switching positions S1 and S2 can be implemented in a simple manner.

In order to facilitate a flow through of a suitable amount of hydraulic fluid the plunger 36 includes at least one hydraulic flow through groove 40. Additionally the transversal bore holes 41 shown in FIGS. 7 and 8 can also be provided in the housing 35. According to an alternative embodiment the hydraulic fluid pass through groove 40 can also be configured in the housing 35.

The spring element 37 is provided preloaded between a housing shoulder 42 and a spring washer 43, wherein the spring washer 43 is advantageously provided as a safety disc that is clipped into a shoulder of the plunger 36.

Figure 9:
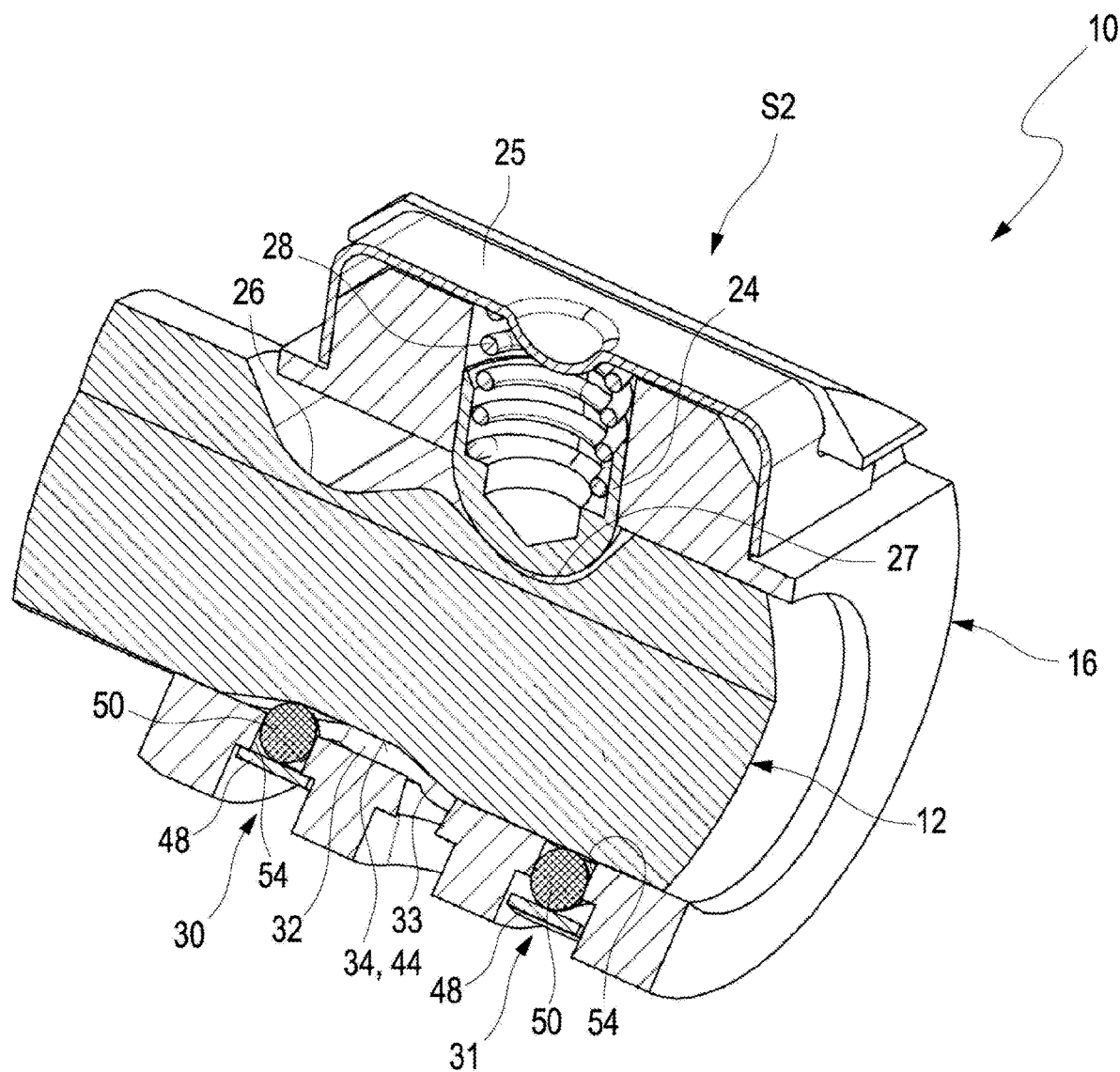
FIG. 9 illustrates a schematic three dimensional representation of a switch over valve according to another embodiment of the invention in a longitudinal sectional view.
Figure 10:
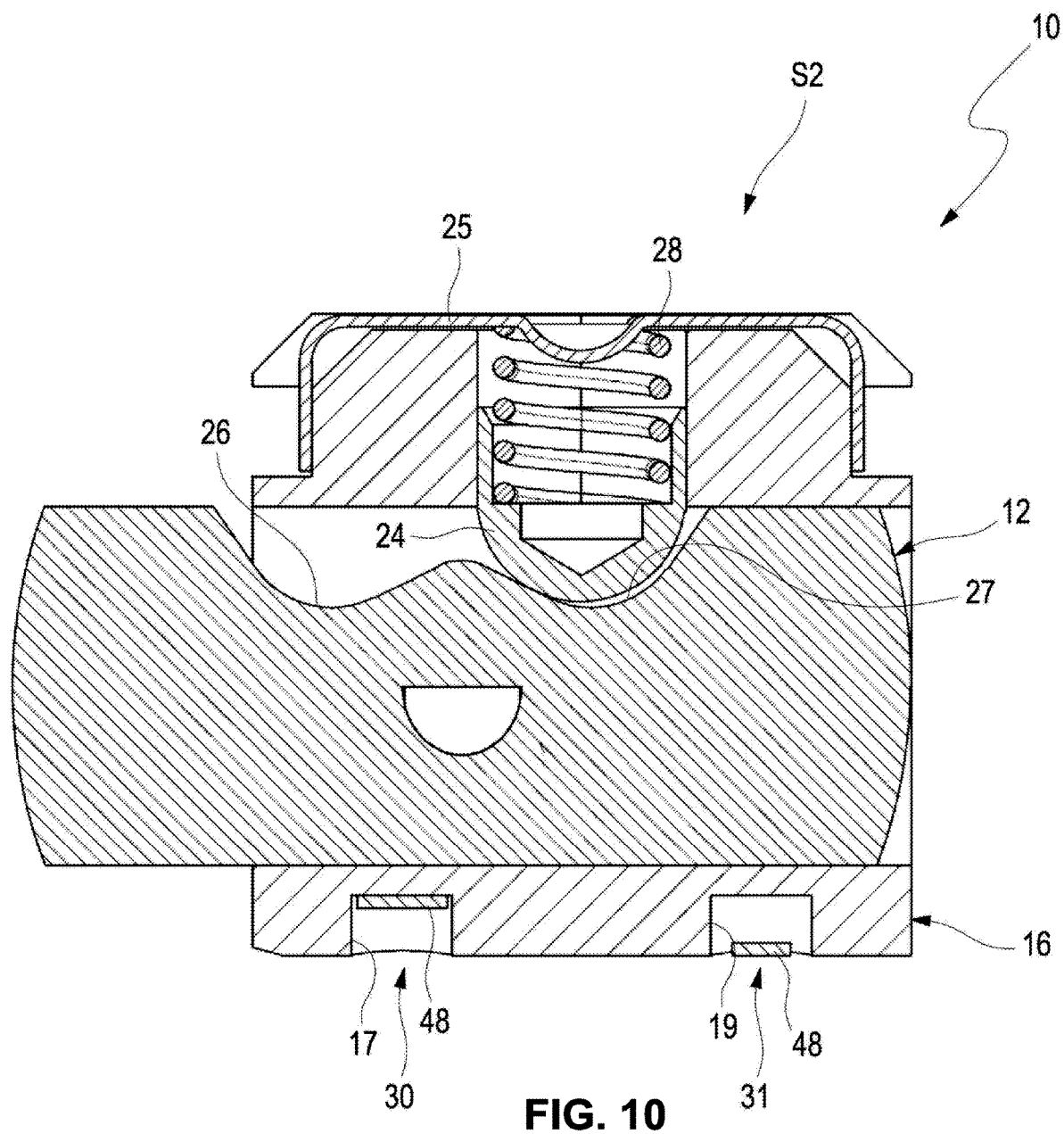
FIG. 10 illustrates a schematic representation of the switch over valve according to another embodiment of the invention in a second longitudinal sectional view.
Figure 11:
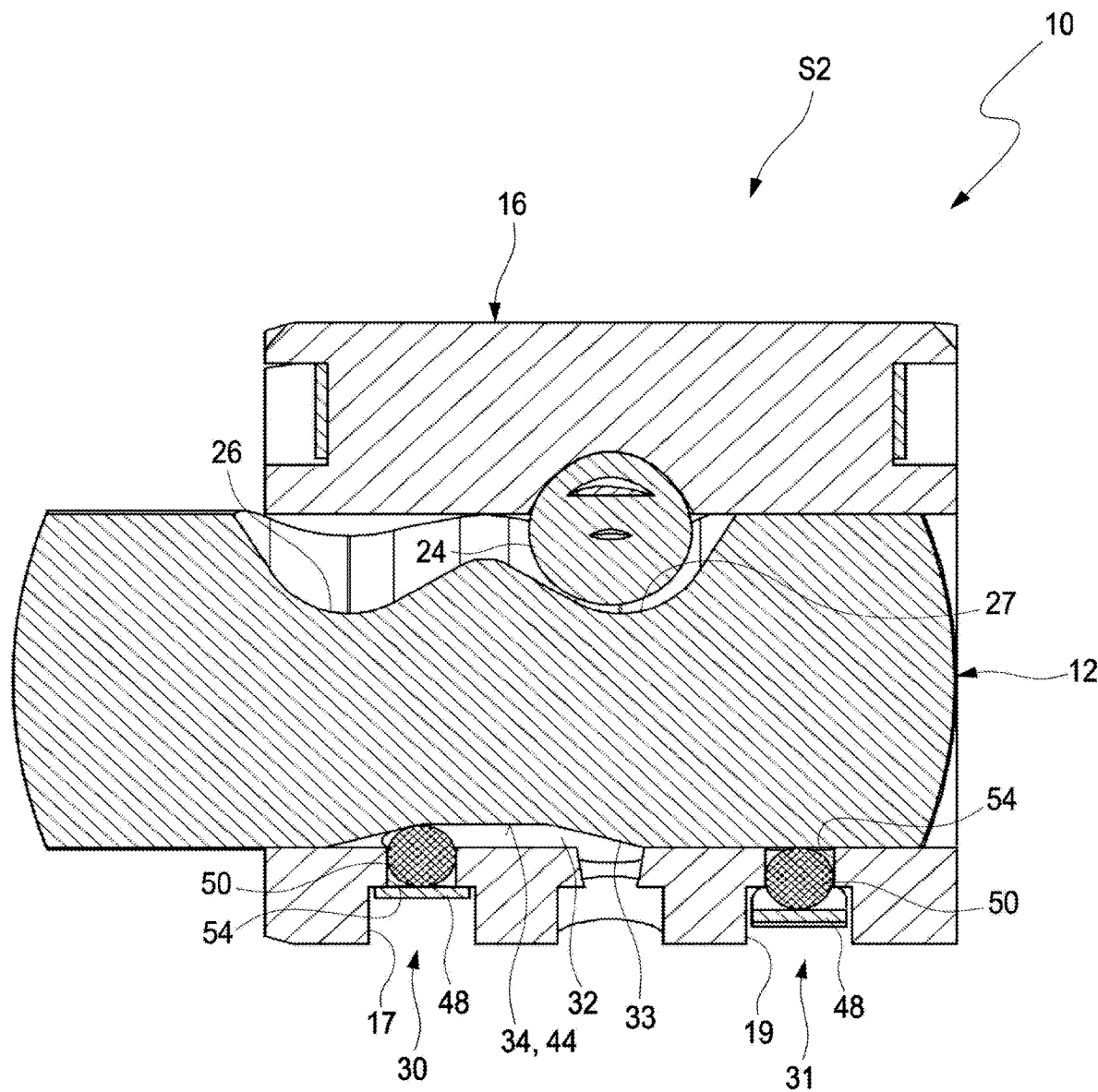
FIG. 11 illustrates schematic representation of the switch over valve according to another embodiment of the invention in a third longitudinal sectional view.
Figure 12:
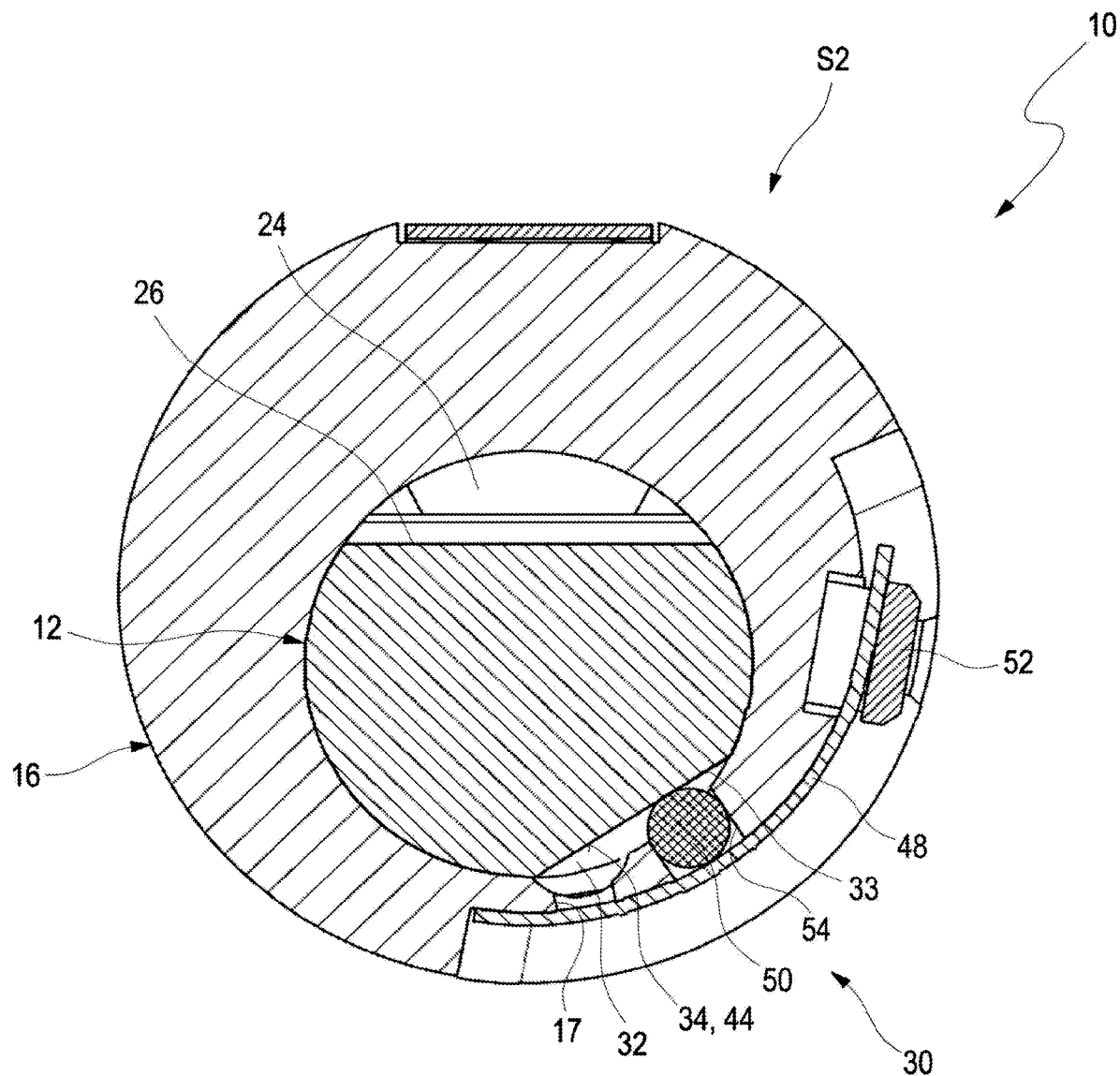
FIG. 12 illustrates a schematic representation of a closed cut off valve of the switch over valve according to FIGS. 9-11 in a cross sectional view.
Figure 13:
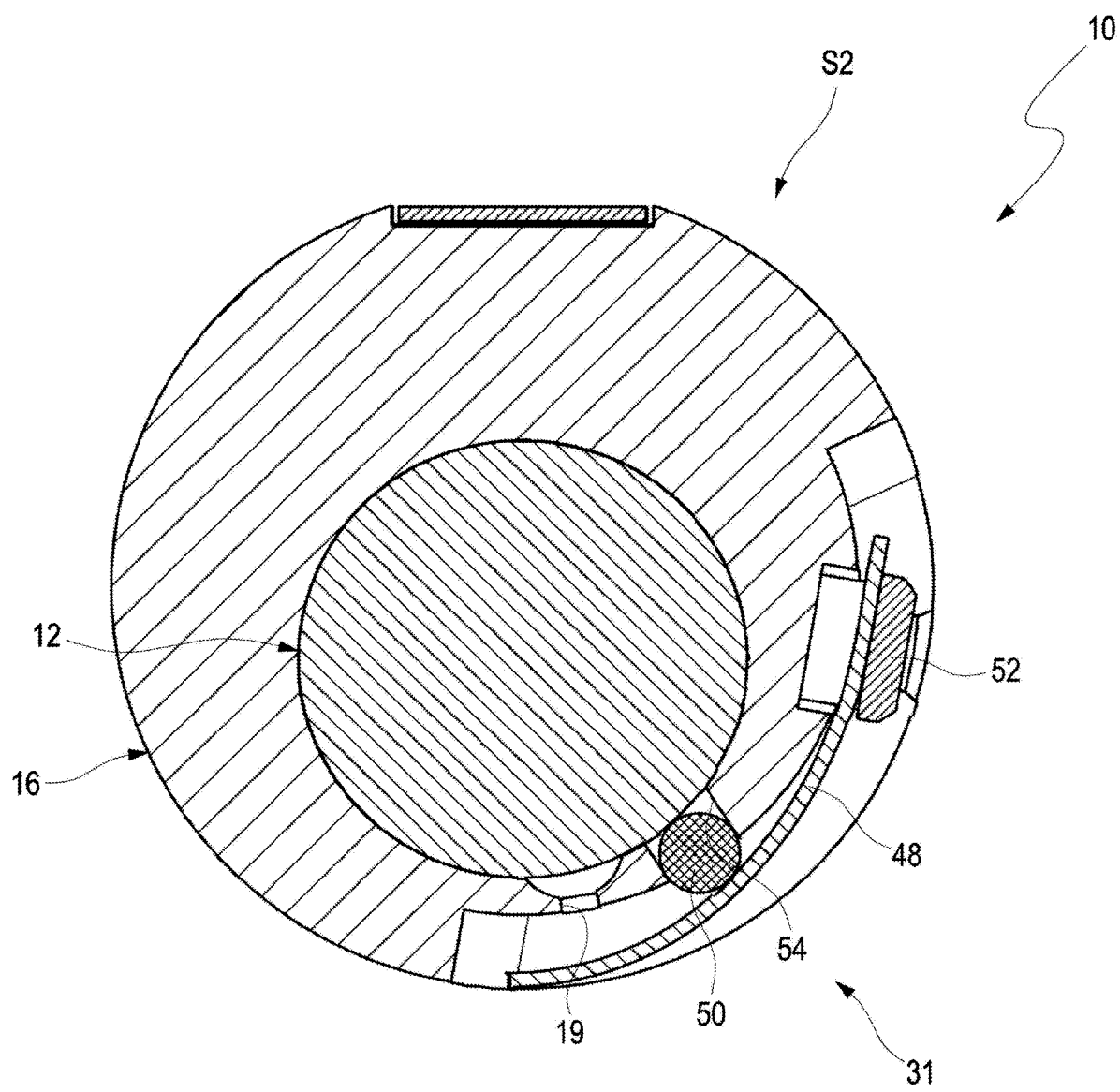
FIG. 13 illustrates a schematic representation of an open cut off valve of the switch over valve according to FIGS. 9-11 in a cross sectional view.

FIGS. 9-13 illustrate another embodiment of the switch over valve 10 according to the invention. FIGS. 9-11 show schematic representations of the switch over valve 10 in longitudinal sectional views, whereas cross sections are respectively illustrated in FIGS. 12 and 13. The embodiment of the switch over valve 10 in FIGS. 9 and 13 is thus illustrated in the second switching position S2 so that the contact element is positioned so that the interlocking element 24 is interlocked in the second locking groove 27. Thus, the first cut off valve 30 is closed and the second cut off valve 31 is opened so that the hydraulic cavity that is connected with the second hydraulic fluid conduit 20 can drain.

In the embodiment illustrated in FIGS. 9-13 the cut off valves 30, 31 respectively include a leaf spring element 48 configured as a valve closing element which is arranged in a circumferential direction of the connecting section 16 and which is applicable in a sealing manner in a first condition of the cut off valve 30, 31 to the sleeve shaped connecting section 16 above the bore holes 17, 19 and which is respectively actuatable by a radially moveable ball element 50. The leaf spring element 48 is thus openable and closable by the ball element 50 by an axial movement of the contact element 12 by the profile surface 44. The ball element 50 is thus pushed in a radial direction towards the outside by an axial movement of the contact element 12 through a rolling of the ball element 50 on the profile surface 44 of the inner profile 34 of the recess 33 arranged on the contact element 12 from its ball seat 54 and thus also presses the leaf spring element 48 in a radially outward direction. Thus, the leaf spring element 48 lifts off from the sleeve shaped connecting section 16 and thus releases the bore hole 17 or 19. Thus, the cut off valve 30 or 31 is open. The profile surface 44 is thus configured so that either the first cut off valve 30 is open and the second cut off valve 31 is closed (first switching position S1) or the first cut off valve 30 is closed and the second cut off valve 31 is open (second switching position S2).

The longitudinal sectional views illustrated in FIGS. 9 and 11 are selected so that the cut off valves 30, 31 are respectively cut in a portion where the ball elements 50 which are radially moveable in the ball seats 54 are arranged, wherein the longitudinal section line illustrated in FIG. 10 is arranged so that the cut off valves 30, 31 are cut in the portion of the bore holes 17, 19. Thus, the first cut off valve 30 is closed since the switch over valve 10 is illustrated in the second switching position S2, whereas the second cut off valve 31 is open. The leaf spring element 48 of the first cut off valve 30 therefore contacts the sleeve shaped connecting section 16 in a sealing manner, whereas the leaf spring element 48 of the second cut off valve 31 is lifted off from the sleeve shaped connecting section 16.

In FIG. 11 the ball element 50 of the first cut off valve 30 contacts the profile surface 44 and thus radially penetrates the interior of the sleeve shaped connecting section 16 so that the leaf spring element 48 can contact the sleeve shaped connecting section 16 in a sealing manner. In this position the first cut off valve 30 is closed wherein the ball element 50 of the second cut off valve 31 is pressed in a radially outward direction so that the leaf spring element 48 of the second cut off valve 31 is lifted off from the outer surface of the sleeve shaped connecting section 16 so that the second cut off valve 31 is open.

In FIGS. 12 and 13 the switch over valve 10 is respectively illustrated in a cross sectional view so that the first cut off valve 30 or the second cut off valve 31 is illustrated in a sectional view. The leaf spring element 48 is respectively arranged with a spring support 52 at the sleeve shaped connecting section 16. Thus, an end of the leaf spring element is fixated. Thus, the leaf spring element 48 can be pressed in the radially outward direction by a radial movement of the spring element 50 which is caused by an axial movement of the contact element 12 in the sleeve shaped connecting section 16 with the profile surface 44 and the leaf spring element 48 can be lifted from the outer surface of the sleeved shaped connecting section 16 with the other end of the leaf spring element 48.

In FIG. 12 the closed cut off valve 30 of the switch over valve 10 is illustrated in which the leaf spring element 48 covers the bore hole 17 in a sealing manner since the ball element 50 protrudes in the portion of the profile surface 44 into an interior of the sleeve shaped connecting section 12 and thus does not press the leaf spring element 48 in outward direction so that the cut off valve 30 is closed.

FIG. 13 illustrates the open cut off valve 31 of the switch over valve 10 in which the leaf spring element 48 is pressed in the radially outward direction by the ball element 50 which is pressed in a radially outward direction by the profile surface 44 of the sleeve shaped connecting section 16 so that the leaf spring element 48 lifts off from the bore hole 19 so that the cut off valve 31 is open.

The invention is not limited to the embodiments recited supra. Within the scope of the invention the switch over valve 10 according to the invention can also be provided in other embodiments. Also the piston rod 1 is not limited to the illustrated embodiment.

The switch over valve 10 according to the invention with the integrated cut off valves 30, 31 provides a level of sealing that is improved over known embodiments and thus an improved positional stability of the piston rod 1. Thus an unintended change of the compression ratio can be avoided.

By integrating the two cut off valves 30, 31 it is furthermore feasible to omit the check valves in the hydraulic fluid conduits through which the hydraulic cavities are loadable with the hydraulic fluid. The pressure differential in a case where suction occurs provides a greater opening stroke of the plungers 36 than what is facilitated by an actuation through the inner profile 34.

What is claimed is:

1. A switch over valve for controlling a hydraulic fluid flow, the switch over valve comprising:
   a contact element; and
   a sleeve shaped connecting section including
      a contact element bore with an axis,
      a first bore hole for connecting with a first hydraulic fluid conduit,
      a second bore hole for connecting with a second hydraulic fluid conduit, and
      a relief bore hole for connecting with a relief channel,
   wherein the contact element is arranged in the contact element bore and displaceable along the axis in a displacement direction into a first switching position or a second switching position,
   wherein the first hydraulic fluid conduit is connected with the relief channel in the first switching position and the second hydraulic fluid conduit is connected with the relief channel in the second switching position,
   wherein a first cut off valve and a second cut off valve are provided which are integrated into the switch over valve,
   wherein the first cut off valve and the second cut off valve include valve closing elements that are driven by the contact element to move in a respective radial direction of the sleeve shaped connecting section wherein the respective radial direction is transversal to the displacement direction of the contact element,
   wherein all the valve closing elements move at an angle relative to each other in a single identical plane that is orthogonal to the displacement direction of the contact element, and
   wherein the first cut off valve releases or blocks a flow of the hydraulic fluid from the first bore hole or the second cut off valve releases or blocks a flow of the hydraulic fluid from the second bore hole in a direction towards the relief channel as a function of a position of the contact element.

2. The switch over valve according to claim 1, wherein the first cut off valve and the second cut off valve are arranged in the sleeve shaped connecting section respectively in a portion of the first bore hole and the second bore hole.

3. The switch over valve according to claim 1, wherein the contact element includes an inner profile with two profile surfaces for actuating respectively the first cut off valve and the second cut off valve.

4. The switch over valve according to claim 1,
   wherein the first cut off valve is opened in the first switching position by actuating the first cut off valve with the first profile surface and the second cut off valve is closed, and
   wherein the second cut off valve is opened in the second switching position by actuating the second cut off valve with the second profile surface and the first cut off valve is closed.

5. The switch over valve according to claim 1, wherein the contact element is configured fixable by an interlocking element in the first switching position in a first interlocking groove and in the second switching position in a second interlocking groove.

6. The switch over valve according to claim 1,
wherein the first cut off valve and the second cut off valve respectively include a plunger configured as the valve closing element that is displaceably arranged in a housing, and
wherein the valve closing element is applicable in a sealing manner by a spring element at a valve seat at the housing.

7. The switch over valve according to claim 6, wherein the first cut off valve and the second cut off valve are openable and closable by actuating a respective plunger by profile surfaces arranged at the contact element which is moved in an axial direction.

8. The switch over valve according to claim 6, wherein the respective plunger is applicable to the valve seat through an axial pull force by the spring element in a sealing manner.

9. The switch over valve according to claim 6, wherein the plunger is provided essentially cylindrical.

10. The switch over valve according to claim 6, wherein the valve seat is configured cone shaped.

11. The switch over valve according to claim 6, wherein the plunger or the housing include at least one hydraulic fluid flow through groove.

12. The switch over valve according to claim 6, wherein the contact element is configured so that an axial movement of the contact element causes a radial movement of the plunger.

13. The switch over valve according to claim 6, wherein the spring element is arranged preloaded between a housing shoulder and a spring plate, wherein the spring plate is configured as a lock plate that is snap locked into a shoulder of the plunger.

14. The switch over valve according to claim 6, wherein the first cut off valve and the second cut off valve are respectively provided with a housing that is pressed into the sleeve shaped connecting section against a shoulder of the first bore hole and the second bore hole respectively.

15. The switch over valve according to claim 6, wherein the first cut off valve and the second cut off valve are respectively provided as a pre-assembled sub assembly.

16. The switch over valve according to claim 6, wherein the plunger and the housing include at least one hydraulic fluid flow through groove.

17. A piston rod for a variable compression ratio of an internal combustion engine, comprising:
an eccentrical element adjustment device for adjusting an effective connecting rod length,
wherein the eccentrical element adjustment device includes an eccentrical element interacting with an eccentrical lever;
two pistons that are respectively displaceably supported in a hydraulic cavity,
wherein eccentrical element rods of the eccentrical element adjustment device engaging the eccentrical element are supported at the two pistons, and
wherein an adjustment travel of the eccentrical element adjustment device is adjustable by the switch over valve according to claim 1.

* * * * *